(12) United States Patent
Lemoine et al.

(10) Patent No.: US 10,801,609 B2
(45) Date of Patent: Oct. 13, 2020

(54) METHOD OF ASSEMBLING A PLANET CARRIER

(71) Applicant: SAFRAN TRANSMISSION SYSTEMS, Colombes (FR)

(72) Inventors: Julie Lemoine, Moissy-Cramayel (FR); Guillaume Julien Beck, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 70 days.

(21) Appl. No.: 16/307,879

(22) PCT Filed: Jun. 6, 2017

(86) PCT No.: PCT/FR2017/051425
§ 371 (c)(1),
(2) Date: Dec. 6, 2018

(87) PCT Pub. No.: WO2017/212166
PCT Pub. Date: Dec. 14, 2017

(65) Prior Publication Data
US 2019/0301593 A1  Oct. 3, 2019

(30) Foreign Application Priority Data
Jun. 7, 2016 (FR) ...................................... 16 55203

(51) Int. Cl.
*F16H 57/00* (2012.01)
*F16H 57/08* (2006.01)
(Continued)

(52) U.S. Cl.
CPC ............ *F16H 57/082* (2013.01); *B23P 19/04* (2013.01); *F02C 7/36* (2013.01); *F02K 3/06* (2013.01);
(Continued)

(58) Field of Classification Search
CPC .. F16H 57/082; F16H 1/28; F16H 2057/0056; F16H 2057/0062; B23P 19/04;
(Continued)

(56) References Cited

U.S. PATENT DOCUMENTS 6,206,800 B1 *  3/2001  Kay ...................... F16H 1/2836
                                              475/346
10,005,623 B1 *  6/2018  Svejkovsky ........... B65G 47/72
(Continued)

FOREIGN PATENT DOCUMENTS

WO          94/29614 A1    12/1994

OTHER PUBLICATIONS

Preliminary Research Report and Written Opinion received for French Application No. 1655203, dated Feb. 1, 2017, 9 pages (1 page of French Translation Cover Sheet and 8 pages of original document).

(Continued)

*Primary Examiner* — Rick K Chang
(74) *Attorney, Agent, or Firm* — Womble Bond Dickinson (US) LLP (57) ABSTRACT

The invention relates to a method for assembling (S) a planet carrier (16), comprising the following steps: separately producing (S1) the cage (20) and the cage carrier (30), providing a machining allowance at one element from among the through-holes (23, 25) in at least one upright (21) of the cage (20) or the through-hole (32) in a finger bar (31) of the cage carrier (30), and/or at one element from among a bearing seat (26) or a rolling bearing seat (41, 42); assembling (S2) the cage (20) and the cage carrier (30) and securing (S3) same to produce a one-piece assembly; determining (S4) the position of a reference axis (Y1, Y2) linked to the cage (20), to the cage carrier (30) and/or to the shaft (40); and, taking account of the position of the reference axis (Y1, Y2), machining (S5) all or part of the machining allowances.

10 Claims, 7 Drawing Sheets

(51) Int. Cl.
*B23P 19/04* (2006.01)
*F02C 7/36* (2006.01)
*F02K 3/06* (2006.01)
*F16H 1/28* (2006.01)

(52) U.S. Cl.
CPC .............. *F05D 2230/60* (2013.01); *F05D 2260/40311* (2013.01); *F16H 1/28* (2013.01); *F16H 2057/0056* (2013.01); *F16H 2057/0062* (2013.01)

(58) Field of Classification Search
CPC .......... F02C 7/36; F02K 3/06; F05D 2230/60; F05D 2260/40311
See application file for complete search history.

(56) References Cited

U.S. PATENT DOCUMENTS

| | | | |
|---|---|---|---|
| 10,605,351 B2* | 3/2020 | Sheridan | F01D 25/18 |
| 2004/0065169 A1* | 4/2004 | Ciszak | F16H 57/082 |
| | | | 74/640 |
| 2004/0102274 A1* | 5/2004 | Tesar | F16H 1/46 |
| | | | 475/168 |
| 2004/0259679 A1* | 12/2004 | Becquerelle | F16H 1/2827 |
| | | | 475/331 |
| 2009/0090096 A1* | 4/2009 | Sheridan | F02C 7/36 |
| | | | 60/226.3 |
| 2012/0309583 A1* | 12/2012 | Ai | F16H 1/28 |
| | | | 475/346 |
| 2013/0004297 A1* | 1/2013 | Sheridan | F02K 3/04 |
| | | | 415/122.1 |
| 2013/0023378 A1 | 1/2013 | Mccune et al. | |
| 2020/0072340 A1* | 3/2020 | Lefebvre | F16H 1/28 |
| 2020/0096091 A1* | 3/2020 | Di Giovanni | F16H 57/082 |

OTHER PUBLICATIONS

International Search Report and Written Opinion received for PCT Patent Application No. PCT/FR2017/051425, dated Apr. 12, 2018, 17 pages (8 pages of English Translation and 9 pages of Original Document).

International Preliminary Report on Patentability received for PCT Patent Application No. PCT/FR2017/051425, dated Dec. 20, 2018, 15 pages (8 pages of English Translation and 7 pages of Original Document).

* cited by examiner

METHOD OF ASSEMBLING A PLANET CARRIER

FIELD OF THE INVENTION

The invention relates to the field of turbomachines, and more particularly reducers of turbofans configured to introduce a reduction ratio between the speed of the fan and that of the low-pressure turbine.

TECHNICAL BACKGROUND

Figure 1:
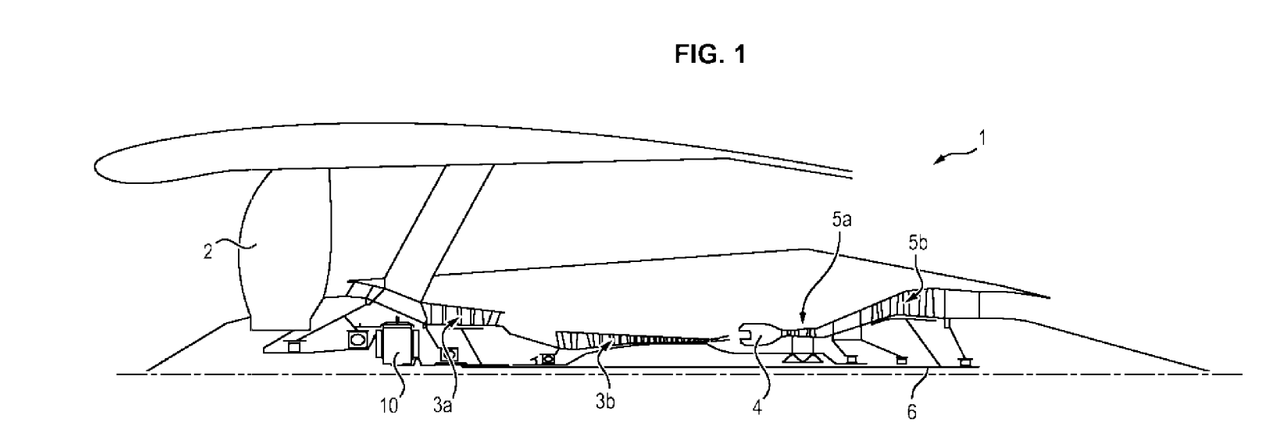
FIG. 1 is a section view of an exemplary embodiment of a turbomachine comprising a reduction mechanism between the fan and the low-pressure shaft.

A turbofan 1 generally comprises, from upstream to downstream in the gas flow direction, a ducted fan 2 accommodated in a fan casing, an annular primary flow space and an annular secondary flow space. The mass of air aspired by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor 3a and a high-pressure compressor 3b, a combustion chamber 4, one or more turbine stages, for example a high-pressure turbine 5a and a low-pressure turbine 5b, and a gas exhaust nozzle.

Typically, the high-pressure turbine 5a drives the high-pressure compressor 3b in rotation by means of a first shaft, called the high-pressure shaft, while the low-pressure turbine 5b drives the low-pressure compressor 3a and the fan 2 in rotation by means of a second shaft 6, called the low-pressure shaft. The low-pressure shaft 6 is generally accommodated inside the high-pressure shaft.

In order to improve the propulsive efficiency of the turbofan 1 and to reduce its specific fuel consumption as well as the noise emitted by the fan 2, turbofans having a high bypass ratio (which corresponds to the ratio between the flow rate of the secondary (cold) flow and the flow rate of the primary flow (high, passing through the primary body)). By high bypass ratio is meant here a bypass ratio greater than 10, for example comprised between 12 and 18.

To attain such bypass ratios, a reduction ratio is introduced between the speed of the fan 2 and that of the low-pressure turbine 5b, thus allowing their respective speeds of rotation to be independently optimized. This can in particular be accomplished by means of a reducer 10 such as an epicyclic or planetary reduction mechanism, placed between the upstream end (with respect to the gas flow direction in the turbofan 1) of the low-pressure shaft 6 and the fan 2. The fan 2 is then driven by the low-pressure shaft 6 by means of the reduction mechanism and an additional shaft, called the fan 2 shaft, which is attached between the reduction mechanism 10 and the fan 2 disk.

The speed of rotation and the fan 2 pressure ratio are thus reduced, which allows an increase in the power extracted by the low-pressure turbine 5b.

A reduction mechanism 10 customarily comprises:
a sun gear 12, centered on the main axis X of the reduction mechanism 10, which drives the low-pressure shaft 6 (input shaft),
a ring gear, centered on the main axis X,
planet gears 14, placed between the sun gear 12 and the ring gear, the teeth of which cooperate with those of the sun gear 12 and of the ring gear, and
a planet carrier 16, on which are mounted planet gears 14, generally by means of planet gear bearings 15.

The ring gear and the axis of the planet gears 14 can be fixed, while the planet carrier 16 rotates around the main axis X of the reduction mechanism 10: this is called an epicyclic reduction mechanism. In this case, the fan 2 shaft (output shaft) is generally attached to the planet carrier 16. As a variant, the satellite carrier 16 can be fixed, while the ring gear and the planet gears 14 rotation around a respective axis of revolution: this is then called a planetary reduction mechanism 10. In this case, the fan shaft 2 is generally attached to the ring gear.

The satellite carrier can be one piece, or as a variant be made of two portions and comprise a cage and a cage carrier connected together by means of connection axles which are shrink-fit to the cage. To this end, the cage includes a series of posts distributed circumferentially around the axis of revolution of the cage and each including an internal saddle and an external saddle. The internal saddle and the external saddle are separated by recess adapted to receive an associated finger of the cage carrier. The internal saddle, the external saddle and the finger each comprise coaxial through openings which extend opposite when the cage is mounted on the cage carrier. In order to attach the cage to the cage carrier, a connection axle is introduced through these openings while being shrink-fit on the internal saddle and the external saddle of the cage. A ball joint is also interleaved between the connection axle and the walls of the opening formed in the finger so as to form a flexible connection decoupling the deformations of the cage carrier and of the cage which can result from the transmission of torque through the planet carrier and defects in alignment of the fan.

The assembly of a planet carried in two portions is, however, very difficult to carry out due to its static redundancy resulting from the considerable number of fingers and saddles to be assembled by means of the flexible connection (generally equal to the number of planet gears). The bores of the plain bearings in the cage must also be located accurately with respect to the axis of revolution of the cage carrier in order to ensure proper operation of the teeth of the planet gears. It has therefore been proposed to accomplish a very accurate rating of the different parts taken separately (with a tolerance on the order of tenths of a micron) so as to ensure the assembly of said parts despite the static redundancy of the planet carrier. Such accuracy is, however, very difficult to obtain, and involves a considerable increase in the cost of manufacture of the parts, which makes this method difficult to implement.

SUMMARY OF THE INVENTION

One objective of the invention is therefore to allow accurate and robust assembly of a planet carrier comprising a cage and a cage carrier despite its static redundancy, which is simple to implement and does not necessitate manufacturing tolerances as strict as in the prior art.

To this end, the invention proposes a method of manufacturing a planet carrier, said planet carrier having an axis of revolution and comprising:
an annular cage comprising:
a series of posts distributed circumferentially around the axis of revolution, each post comprising an internal saddle and an external saddle in each of which is formed a through opening, bearing seats defining bores configured to receive a bearing of a planet gear, an annular cage carrier comprising:

a series of axial fingers distributed circumferentially around the axis of revolution in each of which is formed a through opening, each axial finger being configured to be accommodated between the internal saddle and the external saddle of a post of the cage, a shaft coaxial with the axis of revolution and having at least one antifriction bearing seat, said shaft being attached to the cage carrier, the assembly method comprising the following steps:

producing separately the cage and the cage carrier while providing excess thickness at one of the following elements: the through opening of the internal saddle and the through opening of the external saddle of at least one post of the cage, or the through opening of at least one finger of the cage carrier, and/or at one of the following elements: at least one bearing seat or the at least one antifriction bearing seat, assembling the cage and the cage carrier by placing each axial finger of the cage carrier between an internal saddle and an external saddle of the cage, positioning the cage with respect to the cage carrier and attaching together the cage and the cage carrier so as to achieve a single-piece assembly, determining a position of at least one reference axis linked to the cage, to the cage carrier and/or to the shaft and while taking into account the position of at least one of the reference axes, machining all or part of the excess thicknesses so as to ensure alignment between the through openings of each internal saddle and of each external saddle with the through opening of the associated axial finger on the one hand, and/or of the bearing seats of the cage with the antifriction bearing seats on the other hand.

Some preferred but not limiting features of the manufacturing method are the following, taken individual or in combination:

during the step of producing the cage and the cage carrier, the excess thickness is provided at the through opening of the internal saddle and of the external saddle and/or at the bearing seats, the through opening of the axial fingers and the at least one antifriction bearing seat being free of excess thickness, the reference axes comprise an axis of revolution of the through opening of at least one axial finger of the cage carrier and/or an antifriction bearing axis, said antifriction bearing axis being defined as an axis of symmetry of the at least one antifriction bearing seat of the shaft, the axis of revolution and the axis of the antifriction bearing are determined by three-dimensional metrology of the through opening of the axial finger and of the at least one antifriction bearing seat, respectively, for example by tracing, the cage and the cage carried each comprise a central bore, said central bores being coaxial with the axis of revolution of the planet carrier, and in which the step of assembly comprises a sub-step during which the cage and the cage carrier are positioned so as to align axially and radially their central bore and/or to index them angularly, the step of assembling the cage and the cage carrier is accomplished by the introduction of a set of tools into the central bore of the cage and of the cage carrier and the attachment of said set of tools in said central bores so as to block the cage and the cage carrier with respect to a fixed frame, the set of tools comprises: a first support configured to be introduced with adjustment into the central bore of the cage carrier and a second support configured to be introduced with adjustment into the central bore of the cage, and in which the step of positioning and of attachment of the cage and of the cage carrier comprises the following sub-steps: (i) determining the dimensions of the central bore of the cage and of the central bore of the cage carrier, (ii) machining the first support and the second support depending on the determined dimensions of the central bore of the cage and of the cage carrier so as to ensure an adjusted assembly of said supports with the corresponding central bore, (iii) introducing the first support and the second support into the central bore of the cage carrier and into the central bore of the cage, respectively, and (iv) blocking the cage and the cage carrier so as to make them single-piece by fixing the first support with respect to the second support, or conversely, the method also comprises a step of fixing the first support and the second support with respect to the frame, and/or the set of tools also comprises at least two pins configured to penetrate into the cavities formed in the cage and/or in the cage carrier, and the step of positioning and of attachment of the cage and of the cage carrier also comprises a sub-step during which the pins are introduced into the corresponding cavities in order to angularly index the cage and the cage carrier.

BRIEF DESCRIPTION OF THE DRAWINGS

Other features, aims and advantages of the present invention will appear more clearly upon reading the detailed description that follows, and with reference to the appended drawings given by way of non-limiting examples and in which.

DETAILED DESCRIPTION OF ONE EMBODIMENT

Hereafter, an assembly method of a planet carrier 16 for a reduction mechanism 10 of the epicyclic type will be described at present with reference to the appended figures. This, however, is not limiting, the invention applying equally to the assembly of a planet carrier 16 of a reduction mechanism 10 of the planetary type.

Figure 2:
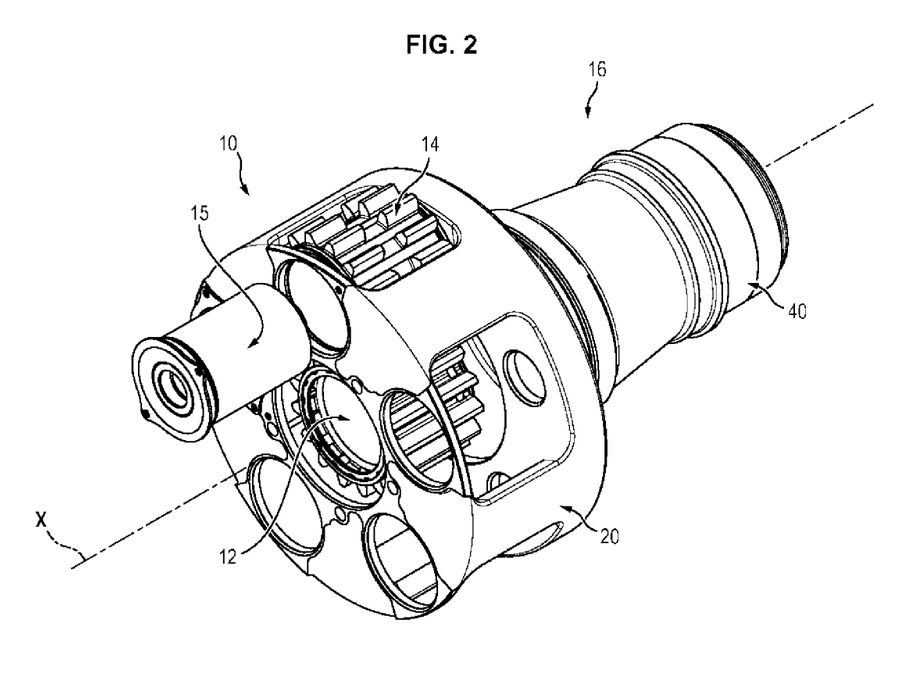
FIG. 2 is a partial exploded and perspective view of an example of a planet carrier for a reduction mechanics, which can be assembled by means of an assembly method conforming to the invention.

The planet carrier 16 has an axis of revolution X, configured to correspond to the axis of rotation of a reduction mechanism 10 in which it is designed to be integrated.

The planet carrier 16 also comprises an annular cage 20 and an annular cage carrier 30, attached together integrally, as well as a drive shaft configured to be connected to the fan.

Figure 4:
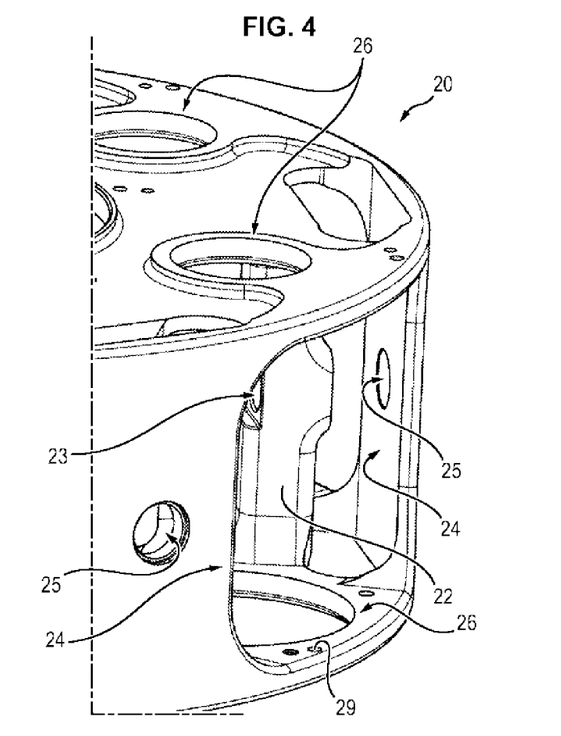
FIG. 4 is a partial view of the cage of the planet carrier of FIG. 2.

The cage 20 comprises a first and a second platform defining together a space configured to receive a central sun gear 12 and planets 14. The first and the second platforms are attached by means of a series of posts 21 distributed circumferentially around the axis of revolution X, each post 21 comprising an internal saddle 22 and an external saddle 24. A through opening 23 is formed in each internal saddle 22 and in each external saddle 24. The through openings 23, 25 of the saddles 22, 24 of the same post 21 are placed opposite so as to define a passage configured to receive a connection axle.

Openings are formed in the second platform of the cage 20, between the internal saddle 22 and the external saddle 24 of each post 21, so as to allow the attachment of the cage 20 to the cage carrier 30.

The cage 20 also comprises a series of bearing seats 26, formed in the internal platform and in the external platform and defining, two by two, bores 27 configured to each receive a bearing 15 of an associated planetary gear 14.

Finally, a central bore 28, coaxial with the axis of revolution X, is formed in the second platform of the cage 20.

Figure 3:
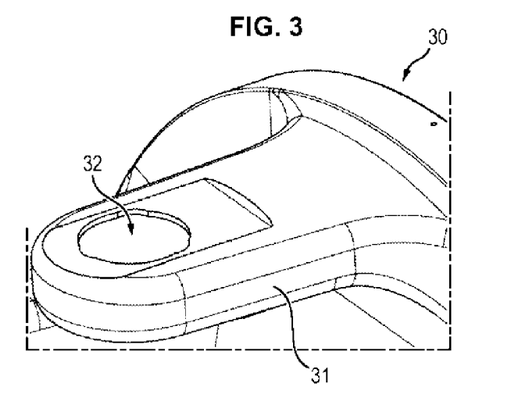
FIG. 3 is a detail view of a finger of the cage carrier of the planet carrier of FIG. 2.

The cage carrier 30 comprises a substantially annular platform on which are attached a series of axial fingers 31 distributed circumferentially around the axis of revolution X. Each finger 31 is configured to be inserted into an associated opening formed in the cage 20 in order to be accommodated between an internal saddle 22 and an external saddle 24 of a given post 21.

Figure 5:
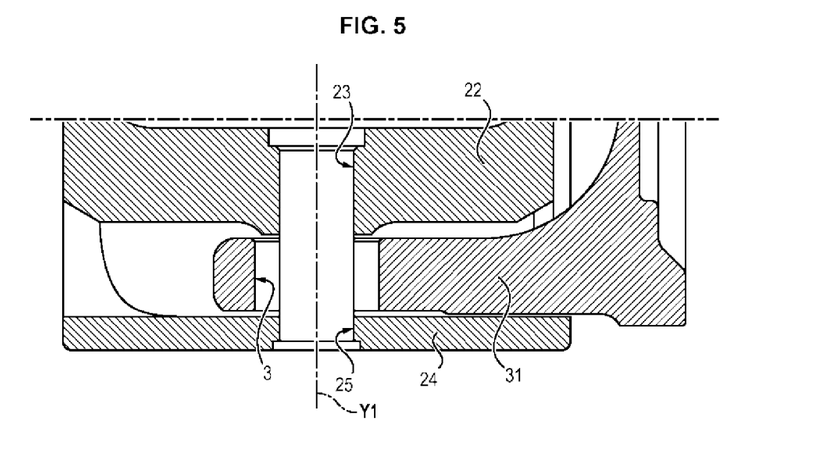
FIG. 5 is a section view of a finger introduced into an internal saddle and an external saddle of the planet carrier of FIG. 2.

A through opening 32 is formed in each finger 31. Each through opening 32 of the fingers 31 is configured to face the through openings 23, 25 of the internal saddle 22 and of the external saddle 24 of the associated post 21, upon passage of the connection axle, so as to allow the attachment of the cage 20 to the cage carrier 30 by means of the connection axle. More precisely, for each post 21 and for each finger 31, a connection axle is introduced in the three facing through openings 23, 32, 25 and shrink-fit in this position on the internal saddle 22 and on the external saddle 24.

A ball joint is also interleaved between each connection axle and the associated finger 31 in order to form a flexible connection between the cage 20 and the cage carrier 30. To this end, the ball joint is shrink-fit on the finger 32 and attached by sliding adjustment on the associated connection axle.

Finally, a central bore 33, coaxial with the axis of revolution X, is formed in the platform of the cage carrier 30.

Figure 6:
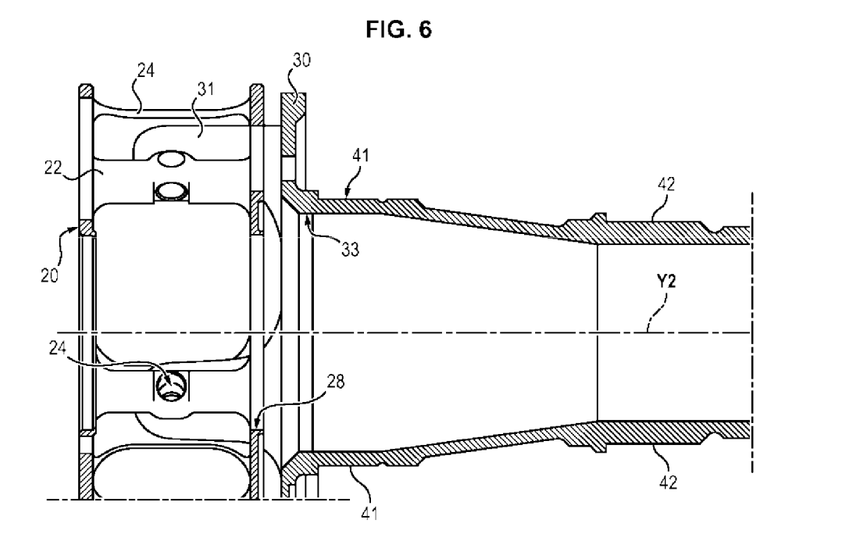
FIG. 6 is a section view of the planet carrier of FIG. 2.

The drive shaft 40 is attached integrally to the platform of the cage carrier 30 so that the drive shaft 40, the bore of the cage 20 and the bore of the cage carrier 30 are coaxial.

Furthermore, the shaft 40 has at least one antifriction bearing seat 41, generally two antifriction bearing seats 41, 42. These antifriction bearing seats 41, 42 are, in a manner known per se, parallel to the axis of rotation of the shaft (which is conflated with the axis of revolution X of the planet carrier).

Figure 11:
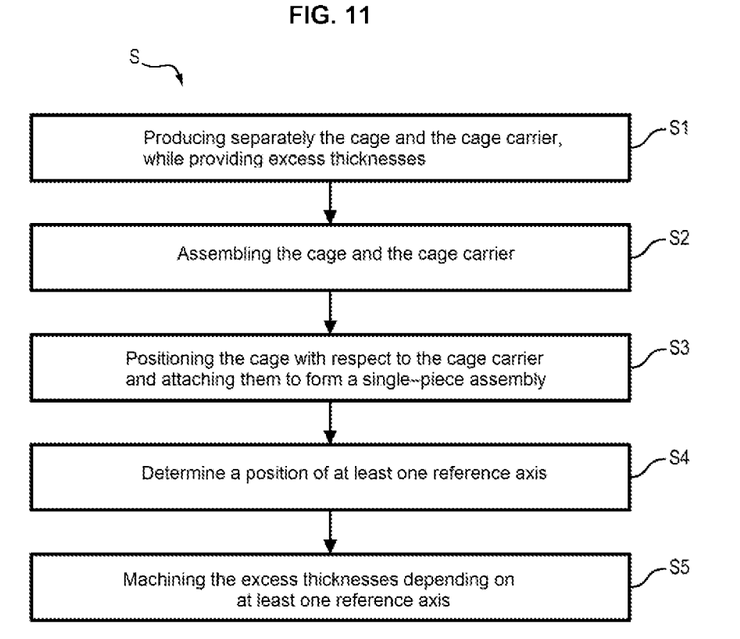
FIG. 11 is a flowchart illustrating steps of an assembly method of a planet carrier for a reduction mechanism conforming to the invention.

In order to accomplish an assembly of the cage 20 and of the cage carrier 30 (pre-equipped with the drive shaft) in a robust and accurate manner, the invention proposes an assembly method S comprising the following steps:

(i) separately produce S1 the cage 20 and the cage carrier 30 while providing excess thickness at one of the following elements: the through hole 23 of the internal saddle 22 and the through opening 25 of the internal saddle 24 of at least one post 21 of the cage 20, or the through opening 32 of at least one finger 31 of the cage carrier 30, and/or at one of the following elements: at least one of the bearing seats 26 or the antifriction bearing seats 41, 42, (ii) assembling S2 the cage 20 and the cage carrier 30 by placing each axial finger 31 of the cage carrier 30 between an internal saddle 22 and an external saddle 24 of the cage 20, (iii) positioning S3 the cage 20 with respect to the cage carrier 30 and attaching together the cage 20 and the cage carrier 30 so as to achieve a single-piece assembly, (iv) determining S4 a position of at least one reference axis Y1, Y2 linked to the cage 20, to the cage carrier 30 and/or the shaft and (v) while taking into account the position of at least one of the reference axes, machine S5 all or part of the excess thicknesses so as to ensure alignment between the through openings 23, 25 of each internal saddle 22 and of each external saddle 24 with the through opening 32 of the associated axial finger 31 on the one hand, and/or of the bearing seats 26 of the cage 20 with the antifriction bearing seat 41, 42 on the other hand.

To this end, during a first step S1, the cage 20 and the cage carrier 30 are produced separately.

During this step S1, an excess thickness is left (or created) at a portion of the through openings 23, 25 of the seats 26 of the bearings.

As we will see hereafter, these excess thicknesses form a local surplus of material allowing future grinding of the openings 23, 25 and of the bearing seats 26 so as to adapt their shape, their positioning and their dimensions to the final tolerances required, depending in particular on the shape, the position and the dimensions of the through opening 32 of the finger 31 and/or of the antifriction bearing seats 41, 42.

If necessary, the through opening 32 of the finger 31 (or of the fingers 31) and/or the antifriction bearing seats 41, 42 can also have excess thickness forming a local surplus of material. Their grinding, however, is carried out before the step S2 of assembling the cage 20 and the cage carrier 30 so as to confer upon them the dimensions, shape and positioning complying with the final tolerances required.

What is meant here by final tolerances are the tolerances sought at the end of the assembly method S. These can be the final tolerances sought during assembly of the parts before the (conventional) step of nitriding, or the final tolerances sought during their final assembly after the nitriding step.

During a second step S2, the cage 20 and the cage carrier 30 are assembled.

To this end, the fingers 31 of the cage carrier 30 are introduced into the associated opening formed in the second platform of the cage 20 so as to bring each finger 31 between an internal saddle 22 and an externa saddle 24. The cage 20 and the cage carrier 30 are then brought together until the associated through openings 23, 32, 25 of the external saddle 24, of the finger 31 and of the internal saddle 22 are in overall alignment.

During a third step S3, the cage 20 is positioned with respect to the cage carrier 30, then the cage 20 and the cage carrier 30 are attached together in this position so as to achieve a single-piece assembly.

Figure 7:
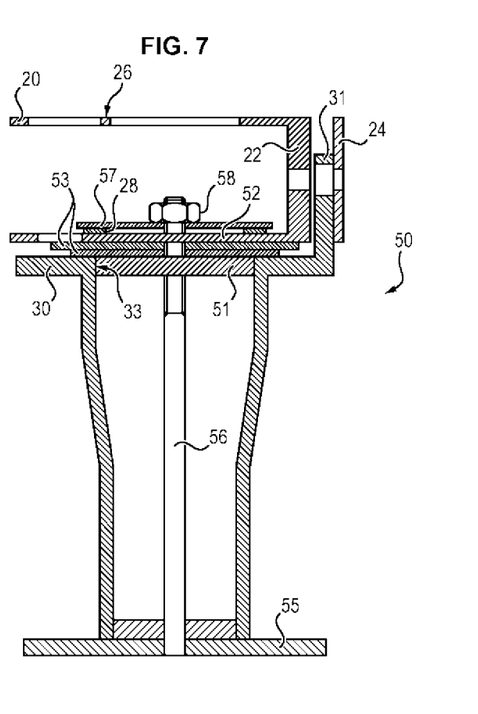
FIG. 7 is an exemplary embodiment of a set of tools which can be used in an assembly method conforming to the invention.
Figure 8:
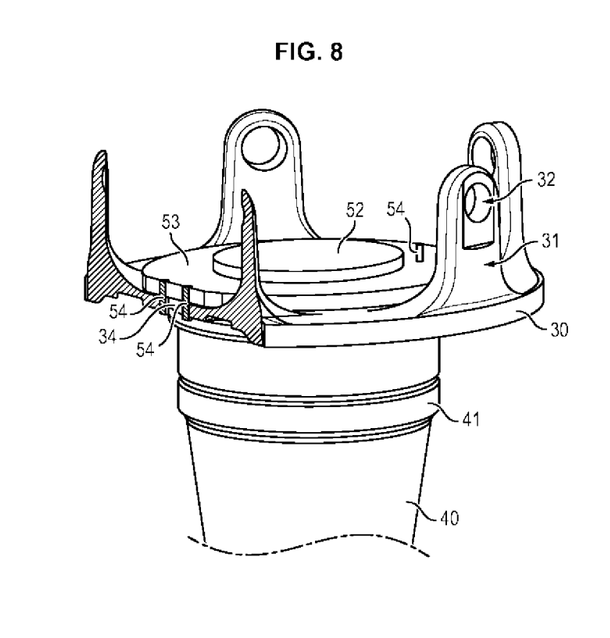
FIG. 8 is a perspective view of a portion of the set of tools of FIG. 7, positioned on the cage carrier of the planet carrier of FIG. 2, of which a portion has been cut away so as to visualize pins introduced into a pre-existing cavity.
Figure 9:
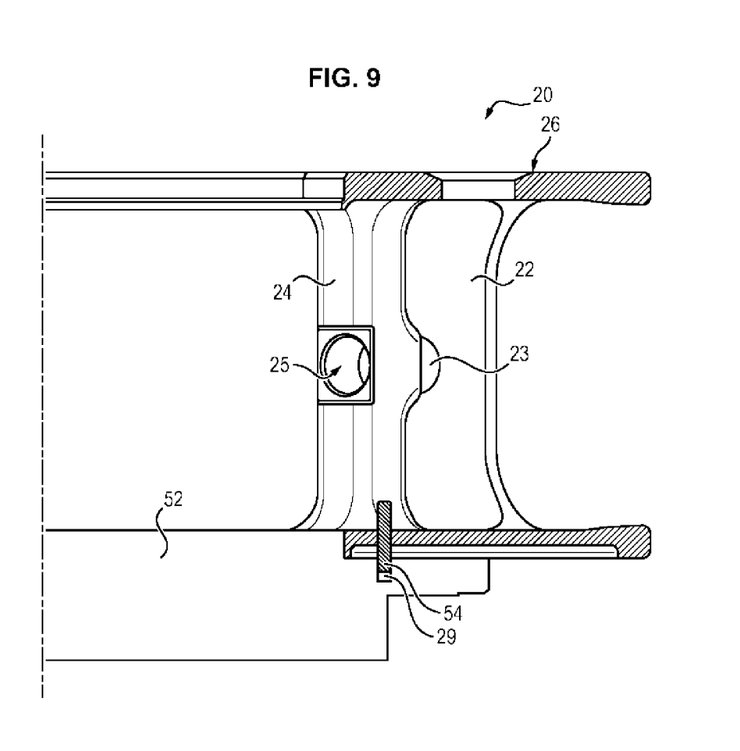
FIG. 9 is a partial perspective view of a portion of the set of tools of FIG. 7 positioned on the cage of the planet carrier of FIG. 2.
Figure 10:
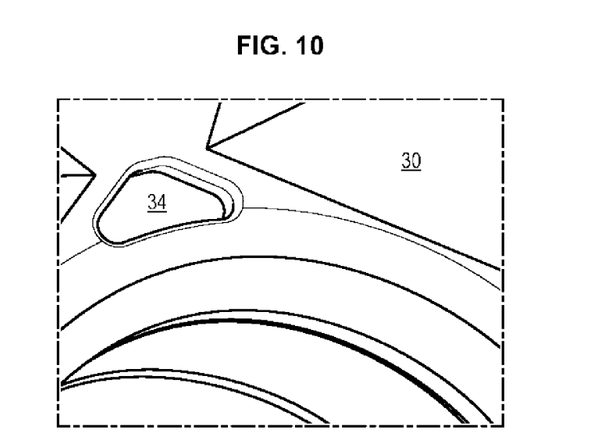
FIG. 10 is a detail view of a pre-existing cavity of the cage carrier of the planet carrier of FIG. 2.

For example, the cage 20 and the cage carrier 30 can be attached to the same set of tools 50. One example of a suitable set of tools is illustrated in FIGS. 7 to 9. It will be noted that this is only one set of tools, proposed without limitation, and that other sets of tools 50 can be developed to implement the third step S3.

Here, the set of tools 50 comprises a first support 51 configured to be introduced with clearance-free adjustment into the central bore of the cage carrier 30 and a second support configured to be introduced with adjustment into the central bore of the cage 20.

The first support 51 comprises a first wafer 51 of circular cylindrical shape, the outer diameter of which is substantially equal to the internal diameter of the central bore of the cage carrier 30. This first wafer 51 is configured to be accommodated with adjustment in the central bore 33 so as to come into continuous contact with its walls, so that the position of the wafer makes it possible to determine with accuracy the position of the cage carrier 30.

In order to obtain the adjustment between the first support 51 and the walls of the central bore 33, the first support 51 can be ground in order to adapt its configuration (shape, dimensions and orientation) to that of the central bore 33. To this end, the walls of the central bore 33 can in particular be traced (any other method of three-dimensional metrology can of course also be considered) after grinding in order to determine the shape, the dimensions and the orientation accurately.

After this grinding step, then the first wafer 51 of the first support 51 and the central bore 33 fit perfectly.

The second support 52 also comprises a second wafer 52 with a circular cylindrical shape the outer diameter of which is substantially equal to the inner diameter of the central bore 28 of the cage 20 so as to be accommodated with adjustment in said central bore 28 to determine with accuracy the position of the cage 20.

Similarly, to the first support 51, the second wafer 52 can be ground in order to obtain a perfect fit of the two parts.

It will be noted that the grinding of the supports 51, 52 allows, in addition to ensuring perfect assembly of the set of tools 50 with the cage 20 and the cage carrier 30, improving the robustness of the method S by ensuring continuity of the dimensioning of the central bores 28, 33 of the cage 20 and of the cage carrier 30.

Moreover, this configuration of the set of tools 50 allows leaving access to all the portions of the cage 20 and of the cage carrier 30, particularly during machining operations. A check of the dimension and of the shape of the supports 51, 52 can then be carried out to allow possible rework.

The first support 51 is preferably attached to the second support 52 so as to guarantee a predetermined height between the cage 20 and the cage carrier 30. For example, additional wafers 53 of suitable thickness can be interleaved so as to adjust said height. These wafers thus allow adjustment of the distance between the central bore 33 of the cage carrier 30 and the central bore 28 of the cage 20 during the positioning and the attachment of the cage carrier 30 and of the cage 20.

The first and the second support 51, 52 can then be introduced into the corresponding central bore 33, 28 and thus ensure axial (along the axis of revolution X of the planet carrier 16) and radial alignment of the central bore 28 of the cage 20 with the central bore 33 of the cage carrier 30.

In order to adjust the angular position of the cage 20 with respect to the cage carrier 30 and to guarantee their concentricity, the set of tools 50 can also comprise angular indexing members 54. For example, the set of tools 50 can comprise two pins 54 for the cage carrier 30, extending from the first support 51 and/or the second support 52 and configured to cooperate with a like number of cavities 29, 34 formed in the cage 20 and in the cage carrier 30 so that, during the assembly of the cage 20 and/or of the cage carrier 30, the pins 54 penetrate into the cavities 29, 34 and thus correct the relative orientation of the cage 20 and of the cage carrier 30. The diameter of the pins 54 is adapted to the diameter of the cavities 29, 34 to achieve assembly without clearance and allow repeatability of assembly.

Preferably, pre-existing cavities 29, 34 in the cage 20 and in the cage carrier 30 are used, for example a hole 29 configured to receive a dowel formed in the cage 20 in proximity to its central bore 28, or two corners of a substantially triangular hole 34 formed in proximity to the central bore 33 of the cage carrier 30. In the case where these examples of cavities 29, 34 are used, the first support 51 then comprises two pins 54 (see FIG. 8) configured to penetrate into the hole 35 at its two corners, while the second support comprises one pin 54 configured to penetrate into the hole 29 in the cage 20 (see FIGS. 4 and 9).

In order to block in position the cage 20 and the cage carrier 30, the first support 51 and the second support 52 are then immobilized with respect to a frame 55, for example an assembly table. To this end, in one embodiment, the set of tools 50 can be assembled fixed with respect to the frame 55.

For example, the set of tools 50 can comprise a rod 56, attached to the frame 55 and comprising a free threaded end, as well as a plate 57 configured to be slipped over the rod 56. The rod 56 extends along a direction substantially perpendicular to the frame 55 and has a greater length than a length of the shaft 40 along the axis of revolution X.

The cage carrier 30 can then be placed on the frame 55 by means of the shaft 40, so that the rod 56 extends substantially coaxially with its axis of rotation. The length of the rod 56 is chosen so that, in this configuration, its free end protrudes from the central bore 33 of the cage carrier 30. The first support 51 is then slipped over the rod 56 and coupled to the central bore 33 of the cage carrier 30. If necessary, the pins 54 of the first support 51 are inserted into an associated cavity 34 formed in the cage carrier 30 in order to angularly index the first support 51, for example into the triangular hole 34. The first support 51 is also placed on the rod 56 so as to be flush with the surface of the platform.

The additional wafers 53 are then successively slipped onto the rod 56 until they reach a height equal to the desired spacing between the cage 20 and the cage carrier 30. In order to allow the immobilization of the set of tools 50, the additional wafer 53 in contact with the first support 51 is dimensioned so as to be supported against the platform of the cage carrier 30 so as to form an abutment.

The second support 52 is then slipped over the rod 56, coaxially with the first support 51, then the cage 20 is coupled to the first support 51. If necessary, the pin 54 of the second support 52 is inserted into an associated cavity 29 formed in the cage carrier 30, for example into the hole 29, so as to angularly position the cage 20 with respect to the cage carrier 30, by means of the second support 52 and of the first support 51. At this stage, the cage 20 and the cage carrier 30 are perfectly coaxial.

Finally, the plate 57 can be slipped over the second support 52 and applied against the cage 20, then a nut 58 can be screwed on the free end of the rod 56 so as to clamp the plate 57 against the cage 20 so as to immobilize the assembly with respect to the frame 55.

In one embodiment, the first support 51, the additional wafer 53 and the second support 52 are a single part, for example formed integrally and in a single piece. The first support 51, the additional wafer 53 and the second support 52 are then placed at the same time between the cage carrier 30 and the cage 20.

The first support 51 and the second support 52 are then shrink-fit in this position.

The cage 20 and the cage carrier 30 are thus positioned accurately with respect to one another by means of the set of tools 50 and are aligned axially, radially and angularly. They also form, with the set of tools 50, a single-piece assembly, which allows accomplishing the rating of one of the parts (for example the cage 20) with respect to the other of the parts (for example the cage carrier 30), which greatly simplifies their machining. Their positioning and their alignment is then checked.

During a fourth step S4, the position of at least one reference axis Y1, Y2, for example of two reference axes, is then determined. This position can in particular be accomplished in any one of the reference frame of the set of tools 50, the reference frame of the cage 20 or the reference frame of the cage carrier 30, in that these three reference frames are at present conflated due to the third step S3 of positioning and attachment.

In a first embodiment, the reference axis corresponds to an axis of revolution Y1 of the through opening 32 of the finger 31 which has no excess thickness (see FIG. 5). Recall in fact that this through opening 23 has been machined to the final tolerances required.

The position of the axis of revolution Y1 of the through opening 23 can be determined by three-dimensional metrology, for example by tracing the through opening 23 and the application of the method of least squares to the measurements thus obtained.

In a second embodiment, the reference axis is an antifriction bearing axis Y2 and corresponds to the common axis formed by the antifriction bearing seats 41, 42 (see FIG. 5). Here too, the antifriction bearing axis Y2 can be determined by three-dimensional metrology, and in particular by tracing at least one of the antifriction bearing seats 41, 42 over all or a portion of the circumference of the shaft 40 and the application of the method of least squares to the measurements thus obtained. Preferably, the antifriction bearing axis Y2 is determined based on both antifriction bearing seats 41, 42.

Hereafter, the method S will be described in the case where both the axis of revolution Y1 of the through opening 23 and the antifriction bearing axis Y2 are determined. This, however, is not limiting, the invention applying equally to the case where only one of these axes Y1, Y2 is determined, particularly when only the through openings 23, 25 of the posts 21 are ground (in which case the reference axis corresponds to the axis of revolution of the through opening 32 of a finger 31) or when only the bearing seats 26 are ground (in which case the reference axis corresponds to the antifriction bearing axis Y2).

During a fifth step S5, the remaining excess thicknesses at the through openings 23, 25 and at the bearing seats 26 are machined.

For a given post 21, the machining of the excess thicknesses of the through openings 23, 25 of each internal saddle 22 and of each external saddle 24 is accomplished by taking into account the axis of revolution Y1 of the through opening 32 of the associated finger 31. It is recalled in fact that the through opening 32 of the finger 31 is already ground (first step S1) and satisfies the final tolerances required, so that the grinding of the through openings 23, 25 of the saddles 22, 24 can be accomplished accurately, starting with its axis of revolution Y1. It will be noted that, in this embodiment, a reference axis (the axis of revolution Y1) is determined for each through opening 23 of each finger 31, so that the through opening 23 of the internal and external saddles 22, 24 is ground depending on a dedicated reference axis.

As a variant, all the through openings 23, 25 of the posts 21 can be machined depending on a single reference axis corresponding to the axis of revolution Y1 of a single finger 31. In this case, it is possible to trace only one of the through openings 32 of the fingers 31 during the third step S3 of the method S. Moreover, an excess thickness can be provided during the first step S1 at the through openings 23, 25 of the other fingers 31, these excess thicknesses being then machined during the fifth step S5 by taking into account the position of the reference axis Y1 so as to grind the other through openings 32.

Similarly, for a given bearing seat 26, the machining of the associated excess thickness is accomplished by taking into account the antifriction bearing axis Y2 of the antifriction bearing seats 41, 42. It is recalled in fact that the antifriction bearing seats 41, 42 are already ground (first step S1) and satisfy the final tolerances required, so that the grinding of the bearing seats 26 can be accomplished with accuracy, starting from the antifriction bearing axis Y2. It will be noted that here a single reference axis (the antifriction bearing axis Y2) is used to grind all the bearing seats 26.

The invention claimed is:

1. A method of assembling a planet carrier comprising:
    separately producing a cage and a cage carrier, wherein the cage comprises a plurality of posts and the cage carrier comprises a plurality of fingers;
    providing a bulge at least one of the following elements: a through opening of an internal saddle and of an external saddle of at least one of the posts of the cage, a through opening of at least one of the fingers of the cage carrier, at least one bearing seat of the cage, and at least one antifriction bearing seat of a shaft attached to the cage carrier,
    assembling the cage and the cage carrier by placing each of the fingers of the cage carrier between an internal saddle and an external saddle of a corresponding post of the cage;
    positioning the cage with respect to the cage carrier and attaching together the cage and the cage carrier so as to obtain a single-piece assembly;
    determining a position of at least one reference axis linked to at least one of the cage, the cage carrier and the shaft; and
    while taking into account the position the of at least one reference axis, machining all or part of the bulge so as to ensure an alignment between at least one of the through opening of the internal saddle and of the external saddle of each of the posts with the through opening of the corresponding finger, and the at least one bearing seat of the cage with the at least one of the antifriction bearing seats.

2. The method according to claim 1, wherein the bulge is provided at least one of the following elements: the through opening of the internal saddle and of the external saddle and at the bearing seats, the through opening of the at least one of the fingers and the at least one antifriction bearing seat being free of bulge.

3. The method according to claim 2, wherein the at least one reference axis comprise at least one of the following axis: an axis of revolution of the through opening of the at least one the axial fingers and an antifriction bearing axis, wherein antifriction bearing axis is defined as an axis of symmetry of the at least one antifriction bearing seat.

4. The method according to claim 3, wherein the axis of revolution and the antifriction bearing axis are determined by three-dimensional metrology of the through opening of the axial at least one of the finger and of the at least one antifriction bearing seat, respectively.

5. The method according to claim 1, wherein the step of assembly comprises at least one of the following sub-steps to position the cage and the cage carrier: aligning axially and radially a central bore of the cage with a central bore of the cage carrier, and indexing the cage and the cage carrier angularly.

6. The method according to claim 5, wherein the step of assembling comprises introducing a set of tools into the central bore of the cage and of the cage carrier and attaching the set of tools the central bore of the cage and of the cage carrier so as to block the cage and the cage carrier with respect to a fixed frame.

7. The method according to claim 6, wherein the set of tools comprises:
- a first support configured to be introduced with adjustment into the central bore of the cage carrier; and
- a second support configured to be introduced with adjustment into the central bore of the cage;

wherein the step of positioning the cage with respect to the cage carrier and attaching together the cage and the cage carrier comprises the following sub-steps:

(i) determining dimensions of the central bore of the cage and of the central bore of the cage carrier, (ii) machining the first support and the second support depending on the determined dimensions of the central bore of the cage and of the central bore of the cage carrier so as to ensure an adjusted assembly of the first support and the second support with the central bore of the cage and the central bore of the cage carrier, respectively, (iii) introducing the first support and the second support into the central bore of the cage carrier and into the central bore of the cage, respectively, and blocking the cage and the cage carrier so as to obtain the single-piece assembly by fixing the first support with respect to the second support, or conversely.

8. The method according to claim 6, also comprising a step of fixing the first support and the second support with respect to the fixed frame.

9. The method according to claim 6, wherein the set of tools also comprises at least two pins configured to penetrate into cavities formed in at least one of the cage and in the cage carrier, and the step of the cage with respect to the cage carrier and attaching together the cage and the cage carrier also comprises a sub-step during which the at least two pins are introduced into the corresponding cavities so as to angularly index the cage and cage carrier.

10. The method according to claim 3, wherein the axis of revolution and the antifriction bearing axis are determined by tracing of the through opening of the at least one of the fingers and of the at least one antifriction bearing seat, respectively.

* * * * *